United States Patent [19]
Campana

[11] Patent Number: 4,913,579
[45] Date of Patent: Apr. 3, 1990

[54] DECORATIVE PANEL

[75] Inventor: James W. Campana, Belle Vernon, Pa.

[73] Assignee: Campana Technology, Inc., Belle Vernon, Pa.

[21] Appl. No.: 255,741

[22] Filed: Oct. 11, 1988

[51] Int. Cl.$^4$ .............................................. F16B 12/26
[52] U.S. Cl. ..................................... 403/294; 403/293; 403/298; 403/381; 403/401; 403/402; 40/152; 40/156
[58] Field of Search ............... 403/294, 298, 381, 401, 403/402, 292, 293; 52/309.15, 309.16; 40/152, 155, 156, 153, 154, 157–160

[56] References Cited

U.S. PATENT DOCUMENTS

| 909,080 | 1/1909 | Goodrow | 403/405.1 X |
| 3,336,689 | 8/1967 | Miller | 403/294 X |
| 4,161,977 | 7/1979 | Baslow | 403/401 X |
| 4,359,294 | 11/1982 | Crillesen | 403/381 X |
| 4,390,578 | 6/1983 | Brooks | 403/270 X |
| 4,438,578 | 3/1984 | Logan | 403/402 X |
| 4,701,066 | 10/1987 | Beam et al. | 403/298 |

FOREIGN PATENT DOCUMENTS 532140 9/1928 Fed. Rep. of Germany ...... 403/294

Primary Examiner—Randolph A. Reese
Assistant Examiner—Franco Deliguori
Attorney, Agent, or Firm—Nils H. Ljungman

[57] ABSTRACT

A decorative panel is for a cabinet, cupboard or the like which includes a plurality of edge frames having mitered ends. A central panel element has a plurality of edges and each of the edge frames has an internal groove for respectively receiving one of the edges therein. Each of the edge frames has a laminated surface material secured to an outer surface thereof. The laminated surface material on each of the edge frames has a terminal portion which is located within the internal edge groove. The edge frames surround the center panel element as the edges are respectively located within the internal edge grooves of the edge frames. Each of the edges of the center panel element secures the terminal portions of the laminated surface material within the internal edge groove. The mitered ends of adjacent edge frames have aligned slots in aligned areas of the outer surfaces thereof which include the laminated surface material. A device for interlocking the mitered ends is disposed within the aligned slots for joining the adjacent edge frames. The device for interlocking the mitered ends includes a portion for overlying the aligned slots and the laminated surface material thereabout.

15 Claims, 1 Drawing Sheet

DECORATIVE PANEL

BACKGROUND OF THE INVENTION

1. Field of the Invention

This invention relates to a decorative panel for a cabinet, cupboard or the like and, more specifically, to such a panel which includes edge frame portions which are joined in a rigid and secure manner without detracting from the aesthetic appearance thereof.

2. Description of the Prior Art:

It is not uncommon for cabinets, cupboards, or the like to include doors, drawer faces, or other panels which are formed with mitered edge frames to provide overall strength and integrity to the panel. Although dowel pin and hole configurations can be used to join mitered ends of such frames, any system joining such frames which is simpler, less complicated, and more reliable would be an attractive alternative for the formation of such decorative panels, doors or drawer faces.

For example, a basic mortise and tenon configuration has heretofore been used to join adjacent elements as an alternative to the basic dowel pin and hole configuration. Such mortise and tenons and other similar types of connectors are shown in U.S. Pat. No. 3,349,536, entitled "Frame Joint and Fastener Therefor"; U.S. Pat. No. 3,336,689, entitled "Picture Frame"; U.S. Pat. No. 4,050,211, entitled "Coupling Device for Joining Together Reinforced Concrete Elements, such as Concrete Piles or Pillars"; U.S. Pat. No. 4,632,589, entitled "Solder-Free Circuit Base Plate"; and U.S. Par. No. 2,378,562, entitled "Die". These patents are incorporated as if included in their entirety herein.

Although such mortise and tenons as disclosed in these prior art patents can be configured to provide proper support for joining mitered frame elements, they would not be as aesthetically attractive as a dowel pin and hole configuration when used to form decorative panels or the like. Specifically, dowel pin and hole connectors are usually employed at the abutting surfaces of the mitered ends so that they are not visible when the door or panel is completely assembled. Although dowel pins and holes are more attractive, they are not easy to use because of the difficulty of aligning the dowel pins with the holes when assembling a door or panel. Further, a positive retention or coupling only occurs after the joints are properly glued and the glue has completely set.

As a result, there remains a need for any configuration which properly joins mitered ends of door, drawer face or panel frames which will ensure their integrity while not detracting from the decorative appearance thereof.

OBJECTS OF THE INVENTION

It is therefore an object of the invention to provide a decorative panel for a cabinet, cupboard or the like which is simple to assemble with the elements thereof being reliably and securely joined.

It is another object of the invention to provide such a decorative panel which is aesthetically pleasant and attractive throughout extended use.

SUMMARY OF THE INVENTION

It is therefore an object of the invention to provide a decorative panel for a cabinet, cupboard or the like which includes a plurality of edge frames having mitered ends. A central panel element has a plurality of edges and each of the edge frames has an internal groove for respectively receiving one of the edges therein. Each of the edge frames has a laminated surface material secured to an outer surface thereof. The laminated surface material on each of the edge frames has a terminal portion which is located within the internal edge groove. The edge frames surround the center panel element as the edges are respectively located within the internal edge grooves of the edge frames. Each of the edges of the center panel element secures the terminal portions of the laminated surface material within the internal edge groove. The mitered ends of adjacent edge frames have aligned slots in aligned areas of the outer surfaces thereof which include the laminated surface material. A device for interlocking the mitered ends is disposed within the aligned slots for joining the adjacent edge frames. The device for interlocking the mitered ends includes a portion for overlying the aligned slots and the laminated surface material thereabout.

The preferred invention also includes a decorative structural element for a cabinet, cupboard or the like which has at least two edge frame portions having abutting ends. Each of the edge frame portions has at least one outer surface. The abutting ends of the edge frame portions have aligned slots in aligned areas of the outer surfaces. A device for interlocking the abutting ends is disposed within the aligned slots for joining the edge frame portions. The device for interlocking the abutting ends includes a portion for overlying the aligned slots and the outer surfaces thereabout.

DESCRIPTION OF THE PREFERRED EMBODIMENTS

Figure 1:
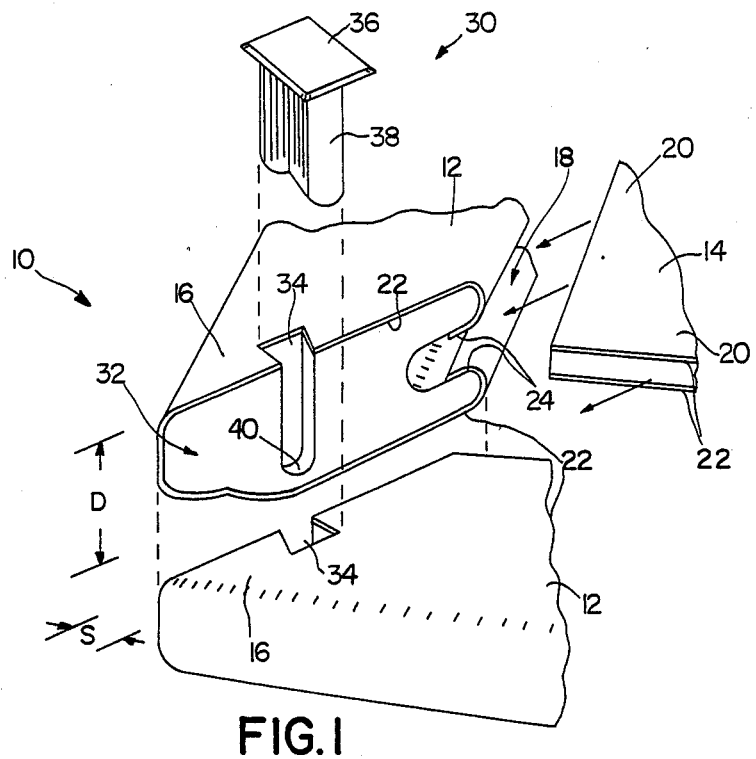
FIG. 1 is an exploded, fragmentary view of a corner region of a preferred panel including various features of the invention.
Figure 2:
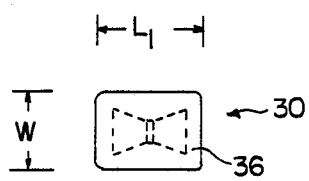
FIGS. 2 through 5 respectively show a top view, side view, bottom view, and end view of a preferred device for interlocking the edge frames of the preferred panel as shown in FIG. 1.
Figure 3:
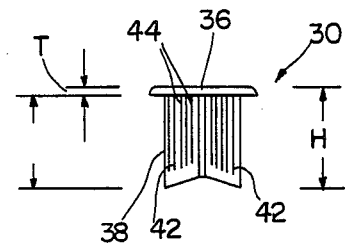
Figure 4:
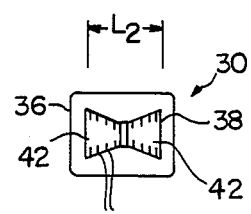
Figure 5:
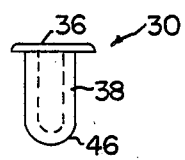

As seen in FIG. 1, a corner region 10 of the preferred decorative panel includes a pair of edge frames 12 and a center panel element 14. Each of the edge frames 12 includes mitered ends 16 so that adjacent edge frames 12 can be joined at the corner region 10 of the preferred decorative panel as they surround and support the center panel element 14. Accordingly, the decorative panel can be used as a door, drawer front, or other form of structural element for a cabinet, cupboard, or other type of decorative furniture or the like.

To properly secure the center panel element 14 within the interior of the edge frames 12, each of the edge frames 12 has an internal edge groove 18 for respectively receiving one of the edges 20 of the center panel element 14 therein.

It should be noted, that the preferred panel of the invention includes the edge frames 12 and center panel element 14 which include exposed, outer surfaces thereof which are covered by a decorative laminated surface material 22. The laminated surface material 22 provides a durable, attractive exterior surface to protect the preferred decorative panels against damage resulting from age, wear or abuse. Additionally, the use of different laminated surface materials 22 for the cabinets, cupboards or the like having the preferred decorative panels means that numerous optional surface designs, colors and styles can be offered for selection by potential customers.

However, although the laminated surface material is aesthetically attractive and quite durable, it is of primary concern that the laminated surface material 22 remains secured to the outer surfaces of the edge frames 12 and center panel element 14 during extensive use of the decorative panel. Accordingly, to prevent separation of the laminated surface material 22 from the region of the internal edge groove 18, the laminated surface material 22 on each of the edge frames 12 includes a terminal portion 24 which is located within the internal edge groove 18 at both, opposite sides thereof. As the preferred decorative panel is being assembled, the center panel element 14 is surrounded by the edge frames 12 as the edges 20 thereof are respectively received within the internal edge grooves 18 of the edge frames 12. As a result, each of the edges 20 also serves to secure the terminal portions 24 of the laminated surface material 22 within the internal edge groove 18 to prevent its undesired movement or separation from the edge frame 12. Additionally, the entrapment of the edges 20 within the internal edge groove 18 will prevent separation of the laminated surface material 22 from the outer surface of the center panel element 14.

As thus described, the preferred decorative panel could include the edge frames 12 being joined at their mitered ends 16 by dowel pin and hole configurations which are well known in the cabinet-making art. However, such joining of the mitered ends 16 is more complicated during assembly which must also include the positive retention of the center panel element 14 in the edge grooves 18. Specifically, with such a dowel pin and hole configuration, the gluing and setting of the mitered ends may require the continuous application of pressure to the corners to insure a proper alignment of the mitered ends 16 and retention of the center panel element 14 until the glue is fully set.

Accordingly, the preferred decorative panel includes the mitered ends 16 of the edge frames 12 being joined by a preferred interlocking device or tenon 30 which is positioned in aligned slot means 32 of the mitered ends 16. The slot means 32 preferably includes a dove-tail slot 34 at each of the mitered ends 16. The use of such an interlocking device 30 in the aligned slots 34 would tend to provide greater rigidity to the assembled structure but would appear to be aesthetically less attractive than the dowel pin and hole configuration located in the abutting surfaces of the mitered ends and thus hidden from view. However, the preferred interlocking device 30 is installed at the back side (the upper side as seen in FIG. 1) of the decorative panel so that it too would not normally be seen unless the door, drawer, or other portion of the cabinet, cupboard or the like is opened for access to the interior thereof. Nevertheless, because there is some exposure to the back side of the decorative panel during use, it is still important for the back side of the panel to have a durable and attractive appearance.

If the edge frames 12 and center panel element 14 were made of the same material throughout, such a joining of the mitered ends 16 by a simplified form of a mortise and tenon might not detract from the aesthetic appearance of the decorative panel. However, because of the preferred laminated surface material 22, it is possible that the laminated surface material 22 around the slot means 32 of the mitered ends 16 would separate from the surface of the edge frames 12 after continued use. An examination of the entire structure of the decorative panel shows that the edges of the laminated surface material 22 are not exposed to normal wear and tear which could result in its separation from the remainder of the decorative panel except in the area surrounding the slots 34. Specifically, as mentioned above, the edges of the laminated surface material 22 at the terminal portions 24 and at the edges 20 of the center panel element 14 are protected after the center panel element 14 is installed within the internal edge grooves 18. Additionally, the edges of the laminated surface material 22 at the abutting surface of each of the mitered ends 16 is so aligned with the edges of the laminated surface material 22 on the adjoining mitered end 16 that snagging, scratching or separation from the adjoining edge frames 12 is unlikely. However, as mentioned above, the particular region around the slots 34 would not normally be protected by the use of a simple trunion or interlocking device if it did not include some of the features included in the preferred interlocking device 30.

In this regard, the preferred interlocking device 30 includes an upper portion 36 which extends beyond the lower, interlocking portion 38 to completely overlie and cover the aligned slot means 32. As a result, the upper portion 36 protects the edges of the laminated surface material 22 which surrounds each of the slots 34 so that they are no longer exposed for possible inadvertent separation from the surface of the edge frames 12.

Before discussing additional features of the preferred decorative panel and, specifically, the locking device 30 thereof, it is appropriate to discuss the various preferred materials used to provide the decorative panel. Although the edge frames 12 and center panel element 14 could be formed of wood or other natural material, the preferred edge frames 12 and center panel element 14 are formed of a medium density fiberboard of the type which can be purchased by the Monsanno Corp., P.O. Box Drawer 369, Spring Hope, N.C. 27882. The preferred laminated surface material is sold under the trademark COREX by the Formica Corp., 10155 Reading Road, Cincinnati, Ohio 45241. Although COREX surface material, sold under the stock nos. 7153; 370; 371; and 7189, has been employed for such decorative panels, there are similar materials sold by other companies which could be alternatively employed. Finally, the preferred locking device 30 is made of a high-impact thermoplastic (ABS) of the type sold by Parker Plastics Corp., 3585 Valley Drive, Pittsburgh, Pa. 15234.

There are additional features of the preferred locking device 30 and the manner in which it is installed within the slots 34 which both simplify installation and insure proper retention after being installed. As seen in FIG. 1, each of the preferred slots 34 includes a predetermined depth D of about 0.920 inches with a slot height S of about 0.340 inches. The depth D and the height S are not particularly critical as long as they are specifically larger than corresponding dimensions of the locking device 20 installed therein. Additionally, the side walls of the preferred dove-tail slot 34 form an angle of about 40 degrees or about 20 degrees to either side of a center line thereof.

As seen in FIGS. 2 through 6, the preferred interlocking device 30 includes the upper portion 36 thereof having a width W of about 0.625 inches and an overall length L1 of about 0.765 inches. The length L1 is clearly greater than twice the height S to insure complete coverage of the slots 34 and the edges of the laminated surface material 22 thereabout.

An insertion height I of the interlocking portion 38 of the interlocking device 30 is about 0.812 inches to provide a general clearance of about 0.06 inches to the base 40 (FIG. 1) of the slot 34 at the predetermined depth D. A thickness T of the upper portion 36 is about 0.046 inches and the edges are slightly rounded to lie as closely and smoothly as possible to the back side of the edge frames 12. Accordingly, an overall height H of the preferred interlocking device 30 is about 0.858 inches.

Figure 6:
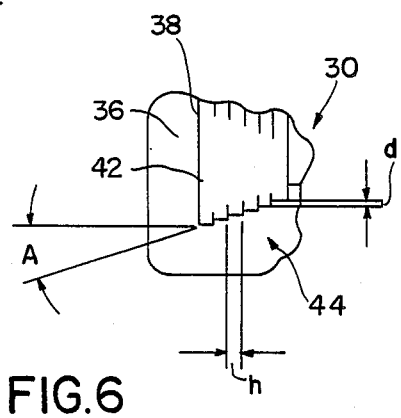
FIG. 6 is an enlarged, fragmentary view of the preferred locking device as seen in FIG. 4 including various features of the invention.

The interlocking portion 38 of the interlocking device 30 is basically formed of two dove-tail portions 42 having an overall length L2 of about 0.515 inches which is clearly less than the combined heights S of the two slots 34. As best seen in FIG. 6, the angle A at each side of the dove-tail portions 42 is about 20 degrees to match the angle of the slots 34. However, each of the dove-tail portions 32 includes serrated interlocking surfaces with a plurality of serrations 44 thereon. The serrations 44 include a height h of about 0.038 inches and a depth d of about 0.014 inches. As mentioned above, the edge frames 12 are made of wood, fiberboard, or some other similarly deformable material. Therefore, upon insertion into the slots 34, the serrations deform the interior walls of the slots 34 to produce a frictional contact between the interlocking device 30 and the slots 34 to prevent any accidental withdrawal. Finally, a bottom 46 of the interlocking portion 38 is rounded to simplify alignment of the interlocking device 30 with the slots 34 as it is being inserted therein.

As thus described, the preferred decorative panel can be simply and quickly assembled to provide a rigid, secure structure while insuring that the various components including the laminated surface material will remain intact after extensive use. Although not mentioned hereinabove, the preferred method of assembly would include a thorough application of glue or other bonding material in the internal edge grooves 18, at the abutting surfaces of the mitered ends 16, and within the slots 34. Although gluing and bonding in this manner is preferred, it should be noted that the preferred configuration provides sufficient rigidity and integrity to the entire assembly to allow subsequent handling and storing of the decorative panel before the glue is fully set.

The invention as described hereinabove in the context of a preferred embodiment is not to be taken as limited to all of the provided details thereof, since modifications and variations thereof may be made without departing from the spirit and scope of the invention.

What is claimed is:

1. A decorative panel for a cabinet, cupboard or the like, said panel comprising:

a plurality of edge frames having mitered ends;

a center panel element having a plurality of edges;

each of said edge frames having an internal edge groove for respectively receiving one of said edges therein;

each of said edge frames having a laminated surface material secured to an outer surface thereof;

said laminated surface material on said each of said edge frames having a terminal portion which is located within said internal edge groove;

said center panel element being surrounded by said edge frames as said edges are respectively located within said internal edge grooves of said edge frames;

each of said edges securing said terminal portion of said laminated surface material within said internal edge groove;

said mitered ends of adjacent ones of said edge frames having aligned slot means in aligned areas of said outer surfaces including said laminated surface material to define material edges of said laminated surface material around said aligned slot means at said outer surfaces;

means for interlocking said mitered ends being disposed within said aligned slot means for joining said adjacent ones of said edge frames;

said means for interlocking said mitered ends including means for completely overlying said aligned slot means and said material edges of said laminated surface material therearound;

said means for completely overlying being substantially rectangular;

said means for completely overlying having at least two sides;

a remainder of said means for interlocking other than said means for completely overlying being centrally located at one side of said means for completely overlying;

said aligned slot means including a first width dimension at abutting edges of said mitered ends and at least a second width dimension remote from said edges of said mitered ends;

said second dimension being greater than said first dimension;

said remainder of said means for interlocking having a third width dimension located at edges of said mitered ends and a fourth dimension remote from said edges of said mitered ends;

said fourth width dimension being greater than said third dimension; and said fourth dimension of said remainder of said means for interlocking being greater than said first dimension of said aligned slot means for said interlocking of said mitered ends for joining said edge frames.

2. The panel according to claim 1, wherein said aligned slot means includes a dove-tail slot in a side of each of said edge frames at said mitered ends, said sides include said aligned areas of said outer surfaces, and said means for interlocking includes a double dove-tail element disposed in both of said dove-tail slots at said side when said dove-tail slots are aligned.

3. The panel according to claim 1, wherein said edge frames are made of a deformable material, said means for interlocking includes at least one serrated interlocking surface, and said serrated interlocking surface deforms an interior surface of said aligned slot means for frictional engagement therebetween when said means for interlocking is disposed withiin said aligned slot means.

4. The panel according to claim 1, wherein said aligned slot means includes a base at a predetermined depth within said edge frame, said remainder of said means for interlocking has a predetermined insertion height which is less than said predetermined depth of said base, and said means for completely overlying said aligned slot means makes contact with said laminated surface material to prevent said remainder of said means for interlocking from contacting said base when disposed within said aligned slot means.

5. The panel according to claim 1, wherein said means for interlocking includes said means for completely overlying said aligned slot means at an external end thereof, said means for interlocking includes an internal end opposite from said external end for insertion into said aligned slot means, and said internal end is at least partially rounded for guiding said means for interlocking into alignment with said aligned slot means during said insertion therein.

6. A decorative structural element for a cabinet, cupboard or the like, said structural element comprising:
   at least two edge frame portions having abutting ends;
   each of said edge frame portions having at least one outer surface and a laminated surface material secured to said outer surface;
   said abutting ends of said edge frame portions having aligned slot means in aligned areas of said outer surfaces including said laminated surface material to define edges of said laminated surface material around said aligned slot means at said outer surfaces;
   said aligned slot means includes a base at a predetermined depth within said edge frame portion, said means for interlocking has a predetermined insertion height which is less than said predetermined depth, and said means for completely overlying makes contact with said laminated surface material to prevent said means for interlocking from contacting said base when disposed within said aligned slot means;
   means for interlocking said abutting ends being disposed within said aligned slot means for joining said edge frame portions; and
   said means for interlocking said abutting ends having means for completely overlying said aligned slot means and said edges of said laminated surface material therearound.

7. The structural element according to claim 6, wherein said aligned slot means includes a dove-tail slot in a side of each of said edge frame portions at said abutting ends, said outer surface is at said side, and said means for interlocking includes a double dove-tail element disposed in both of said dove-tail slots at said side when said dove-tail slots are aligned.

8. The structural element according to claim 6, wherein said edge frame portions are made of a deformable material, said means for interlocking includes at least one serrated interlocking surface, and said serrated interlocking surface deforms an interior surface of said aligned slot means for frictional engagement therebetween when said means for interlocking is disposed within said aligned slot means.

9. The structural element according to claim 6, wherein said means for interlocking includes said means for completely overlying at an external end thereof, said means for interlocking includes an internal end opposite from said external end for insertion into said aligned slot means, and said internal end is at least partially rounded for guiding said means for interlocking into alignment with said aligned slot means during said insertion therein.

10. A decorative panel for a cabinet, cupboard or the like, said structural element comprising:
    a plurality of edge frames having mitered ends;
    a center panel element having a plurality of edges;
    each of said edge frames having an internal edge groove for respectively receiving one of said edges therein;
    each of said edge frames having a laminated surface material secured to an outer surface thereof;
    said laminated surface material on said each of said edge frames having a terminal portion which is located within said internal edge groove;
    said center panel element being surrounded by said edge frames as said edges are respectively located within said internal edge grooves of said edge frames;
    each of said edges securing said terminal portion of said laminated surface material within said internal edge groove;
    said mitered ends of adjacent ones of said edge frames having aligned slot means in aligned areas of said outer surfaces including said laminated surface material to define material edges of said laminated surface material around said aligned slot means at said outer surfaces;
    means for interlocking said mitered ends being disposed within said aligned slot means for joining said adjacent ones of said edge frames; and
    said means for interlocking said mitered ends including means for completely overlying said aligned slot means and said material edges of said laminated surface material therearound and for protecting said material edges of said laminated surface material.

11. The panel according to claim 10, wherein said aligned slot means includes a dove-tail slot in a side of each of said edge frames at said mitered ends, said sides include said aligned areas of said outer surfaces, and said means for interlocking includes a double dove-tail element disposed in both of said dove-tail slots at said side when said dove-tail slots are aligned.

12. The panel according to claim 10, wherein said edge frames are made of a deformable material, said means for interlocking includes at least one serrated interlocking surface, and said serrated interlocking surface deforms an interior surface of said aligned slot means for frictional engagement therebetween when said means for interlocking is disposed within said aligned slot means.

13. The panel according to claim 10, wherein said aligned slot means includes a base at a predetermined depth within said edge frame, said means for interlocking has a predetermined insertion height which is less than said predetermined depth, and said means for completely overlying makes contact with said laminated surface material to prevent said means for interlocking from contacting said base when disposed within said aligned slot means.

14. The panel according to claim 10, wherein said means for interlocking includes said means for completely overlying at an external end thereof, said means for interlocking includes an internal end opposite from said external end for insertion into said aligned slot means, and said internal end is at least partially rounded for guiding said means for interlocking into alignment with said aligned slot means during said insertion therein.

15. A decorative structural element for a cabinet, cupboard or the like, said structural element comprising:
    at least two edge frame portions having abutting ends;

each of said edge frame portions having at least one outer surface and a laminated surface material secured to said outer surface;

said abutting ends of said edge frame portions having aligned slot means in aligned areas of said outer surfaces including said laminated surface material to define edges of said laminated surface material around said aligned slot means at said outer surfaces;

means for interlocking said abutting ends being disposed within said aligned slot means for joining said edge frame portions;

said means for interlocking said abutting ends having an external portion for completely overlying said aligned slot means and said edges of said laminated surface material therearound;

said aligned slot means including a first width dimension at abutting edges of said abutting ends and at least a second width dimension remote from said edges of said abutting ends;

said second dimension being greater than said first dimension;

said means for interlocking having a third width dimension located at said edges of said abutting ends and a fourth width dimension remote from said edges of said abutting ends;

said fourth dimension being greater than said third dimension; and said fourth dimension of said means for interlocking being greater than said first dimension of said aligned slot means for interlocking said abutting ends for joining said edge frame portions.

* * * * *